(12) United States Patent
Hamilton et al.

(10) Patent No.: US 12,135,412 B2
(45) Date of Patent: *Nov. 5, 2024

(54) NON-LINEAR OPTICAL SCANNING MICROSCOPE HAVING KINEMATIC FLEXURE MECHANISM

(71) Applicant: PXYL Limited, Glasgow (GB)

(72) Inventors: Craig James Hamilton, Ralston Paisley (GB); Gordon Robertson, Larkhall (GB)

(73) Assignee: PXYL LIMITED, Glasgow (GB)

( * ) Notice: Subject to any disclaimer, the term of this patent is extended or adjusted under 35 U.S.C. 154(b) by 999 days.

This patent is subject to a terminal disclaimer.

(21) Appl. No.: 17/041,387

(22) PCT Filed: Mar. 26, 2019

(86) PCT No.: PCT/GB2019/050861
§ 371 (c)(1),
(2) Date: Sep. 24, 2020

(87) PCT Pub. No.: WO2019/186142
PCT Pub. Date: Oct. 3, 2019

(65) Prior Publication Data
US 2021/0116693 A1 Apr. 22, 2021

(30) Foreign Application Priority Data
Mar. 27, 2018 (GB) ..................... 1804951

(51) Int. Cl.
*G01N 21/64* (2006.01)
*G01N 21/65* (2006.01)
*G02B 21/00* (2006.01)

(52) U.S. Cl.
CPC ..... *G02B 21/0076* (2013.01); *G01N 21/6458* (2013.01); *G02B 21/0048* (2013.01);
(Continued)

(58) Field of Classification Search
CPC .......... G01N 21/6456; G01N 21/6458; G01N 2021/646; G01N 2021/653–656;
(Continued)

(56) References Cited

U.S. PATENT DOCUMENTS 3,643,015 A 2/1972 Davidovits et al.
5,034,613 A 7/1991 Denk et al.
(Continued)

FOREIGN PATENT DOCUMENTS

CN 103439302 A 12/2013
CN 103743714 A 4/2014
(Continued)

OTHER PUBLICATIONS

Kim, Che-Heung, and Yong-Kweon Kim. "Integration of a microlens on a micro XY-stage." Device and Process Technologies for MEMS and Microelectronics. vol. 3892. SPIE, 1999.
(Continued)

*Primary Examiner* — Ryan S Dunning
(74) *Attorney, Agent, or Firm* — Maschoff Brennan

(57) ABSTRACT

An optical scanning microscope includes an illumination system (160) and an objective lens (134) operable together to provide the excitation radiation (152), (154) in a focal volume (124) at sufficient intensity to cause non-linear emission of emission radiation from a sample in the focal volume. The objective is an aspheric objective configured to focus the excitation radiation without, or with minimal, spherical aberration. The objective lens (134) is scanned by an objective scanner (130), (132). In this example an x-y transducer (xyXD) (130) is connected to a kinematic flexure mechanism (132) which acts as a scanning lens mount. The objective scanner (130), (132) is operable to scan the objective (134) in two dimensions transverse with respect to the
(Continued)

objective's optical axis so as to scan the emitting focal volume (124) in corresponding dimensions.

18 Claims, 11 Drawing Sheets

(52) U.S. Cl.
CPC ... *G01N 2021/653* (2013.01); *G01N 2201/10* (2013.01); *G02B 21/0032* (2013.01); *G02B 21/0036* (2013.01)

(58) Field of Classification Search
CPC ...... G01N 2201/10–1087; G02B 7/023; G02B 7/026; G02B 13/002; G02B 13/18; G02B 21/0032; G02B 21/0036–0048; G02B 21/006; G02B 21/0072; G02B 21/0076; G02B 21/02–04; G02B 21/16
See application file for complete search history.

(56) References Cited

U.S. PATENT DOCUMENTS

| | | | |
|---|---|---|---|
| 6,239,924 | B1 | 5/2001 | Watson et al. |
| 9,042,010 | B2 | 5/2015 | Widzgowski et al. |
| 9,846,121 | B2 | 12/2017 | Schonborn |
| 2001/0033437 | A1 | 10/2001 | Meehan et al. |
| 2001/0048082 | A1 | 12/2001 | Osipchuk et al. |
| 2002/0018291 | A1 | 2/2002 | Fukuyama |
| 2002/0027202 | A1 | 3/2002 | Engelhardt et al. |
| 2002/0163741 | A1 | 11/2002 | Shibazaki |
| 2003/0063379 | A1 | 4/2003 | Fukuyama et al. |
| 2007/0057211 | A1* | 3/2007 | Bahlman ............ G01N 21/6452 250/584 |
| 2007/0109634 | A1 | 5/2007 | Araki et al. |
| 2007/0242916 | A1 | 10/2007 | Said et al. |
| 2009/0097108 | A1* | 4/2009 | Fox ................... G02B 21/0068 359/385 |
| 2010/0261958 | A1 | 10/2010 | Webb et al. |
| 2011/0210269 | A1 | 9/2011 | Nicholson et al. |
| 2012/0080616 | A1* | 4/2012 | Schoenborn ....... G02B 21/0028 250/459.1 |
| 2012/0312957 | A1 | 12/2012 | Loney et al. |
| 2013/0003172 | A1 | 1/2013 | Widzgowski et al. |
| 2014/0008549 | A1 | 1/2014 | Theriault et al. |
| 2014/0236022 | A1 | 8/2014 | Zeng et al. |
| 2015/0069268 | A1 | 3/2015 | Schoenborn |
| 2017/0010456 | A1 | 1/2017 | Gopinath et al. |
| 2017/0242233 | A1 | 8/2017 | Kalkbrenner et al. |
| 2021/0011266 | A1* | 1/2021 | Hamilton ........... G02B 21/0036 |

FOREIGN PATENT DOCUMENTS

| | | |
|---|---|---|
| CN | 104595642 A | 5/2015 |
| CN | 106290284 A | 1/2017 |
| EP | 0810457 A1 | 12/1997 |
| GB | 2 411 288 A | 8/2005 |
| JP | 2002048978 A | 2/2002 |
| JP | 2013519908 A | 5/2013 |
| WO | 0165241 A1 | 9/2001 |
| WO | 2006127967 A2 | 11/2006 |
| WO | 2008025565 A1 | 3/2008 |
| WO | 2009115943 A2 | 9/2009 |
| WO | 2018033582 A1 | 2/2018 |

OTHER PUBLICATIONS

Sharkey, James P., et al. "A one-piece 3D printed flexure translation stage for open-source microscopy." Review of Scientific Instruments 87.2 (2016): 025104.

Office Action in related U.S. Appl. No. 17/041,390, issued on Oct. 6, 2022.

Laszczyk, K. et al., Towards integration of glass microlens with silicon comb-drive X-Y microstage, published in IEEE/LEOS International Conference on Optical MEMs and Nanophotonics, IEEE, Piscataway, NJ, USA, pp. 168-169, Aug. 2008.

Herpe, X. et al., On a simplified nonlinear analytical model for the characterisation and design optimisation of a compliant XY micromotion stage, Robotics and Computer-Integrated Manufacturing, vol. 49, pp. 66-76, Jun. 2017.

Orth, A. et al., Microscopy with microlens arrays: high throughput, high resolution and light-field imaging, Optics Express, vol. 20, No. 12, pp. 13522-13531, Jun. 2012.

Yoo, S. et al., Two-dimensional optical scanner with monolithically integrated glass microlens, Journal of Micromechanics and Microengineering, vol. 24, No. 5, 055009, Apr. 2014.

Kwon, H.N. et al., MicroXY stages with spider-leg actuators for two-dimensional optical scanning, Sensors and Actuators A: Physical, vol. 130-131, pp. 468-477, Aug. 2006.

Davidovits, P. et al., Scanning Laser Microscope for Biological Investigations, Applied Optics, vol. 10, No. 7, pp. 1615-1619, Jul. 1971.

Hamilton, D.K. et al., Scanning optical microscopy by objective lens scanning, Journal of Physics E: Scientific Instruments, vol. 19, No. 1, pp. 52-54, Jan. 1986.

Denk, W. et al., Two-Photon Laser Scanning Fluorescence Microscopy Science, 248 (4951), pp. 73-76, Apr. 1990.

Bargiel, S. et al., New generation of fully integrated optical microscopes on-chip: application to confocal microscope, Proceedings of SPIE, vol. 6186, pp. 618602-1-618602-9, Apr. 2006.

Wang, W. et al., 2-DOF Kinematic XY Stage Design Based on Flexure Element, Proceedings of the 2001 IEEE International Conference on Mechatronics and Automation, pp. 1412-1417, Aug. 2011.

International Search Report and Written Opinion for PCT/GB2019/050861 mailed on Jul. 11, 2019.

International Search Report and Written Opinion for PCT/GB2019/050862 mailed on Jul. 11, 2019.

THORLABS: 4mm Travel Three-Axis Flexure Stage: High Resolution Drives, Motion Control, "Tools of the trade", Jan. 1, 2004, XP093083064.

European Examination Report issued in corresponding application No. 19 721 336.6, dated Sep. 25, 2023.

Office Action in related Japanese Patent Application No. 2021-501106, issued on Nov. 25, 2022.

Office Action in related Japanese Patent Application No. 2021-501107, issued on Jan. 6, 2023.

\* cited by examiner

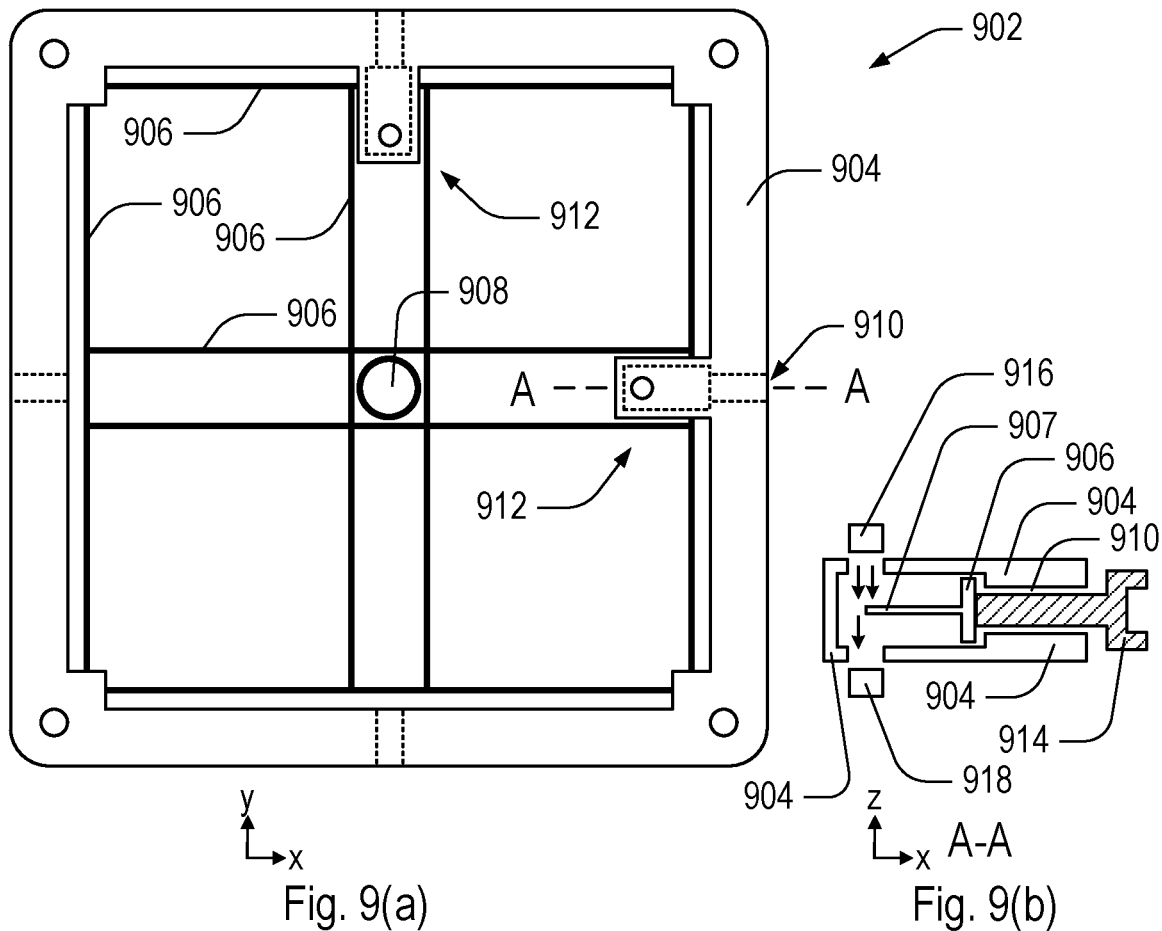
Fig. 9(a)
Fig. 9(b)
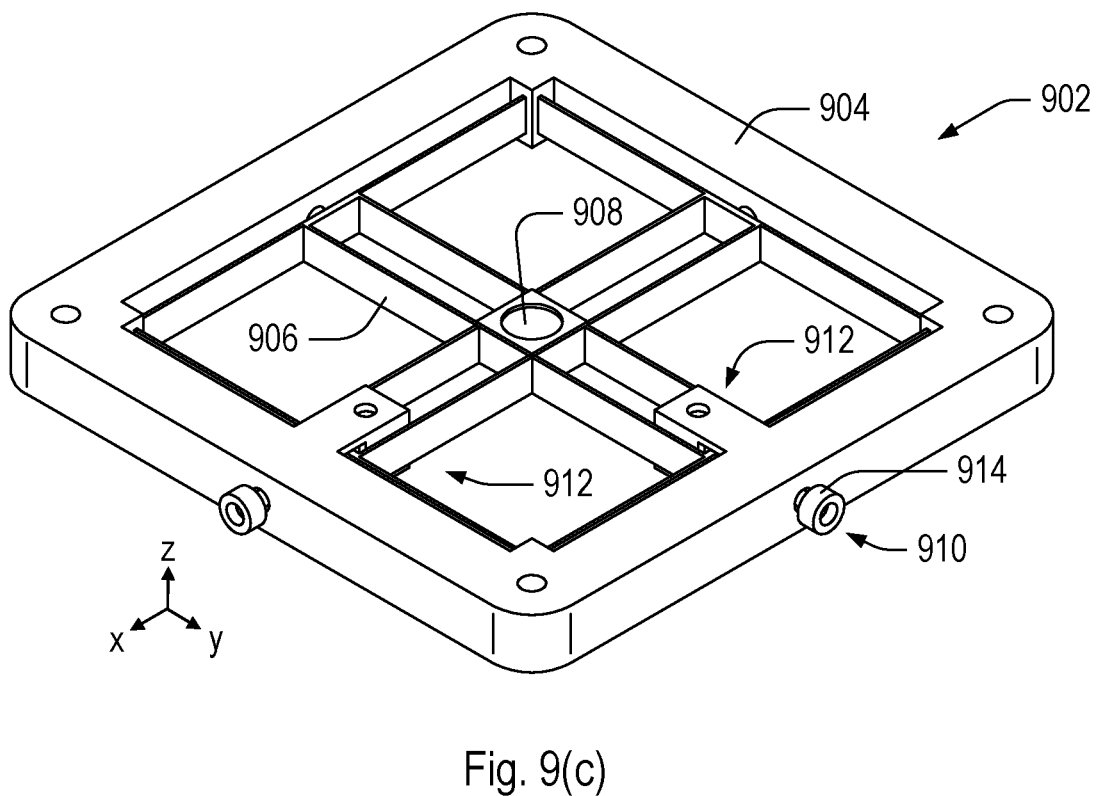
Fig. 9(c)

NON-LINEAR OPTICAL SCANNING MICROSCOPE HAVING KINEMATIC FLEXURE MECHANISM

CROSS-REFERENCE TO RELATED APPLICATIONS

This application is a national phase application of International Patent Application No. PCT/GB2019/050861, filed Mar. 26, 2019, which claims the benefit of GB 1804951.0, filed Mar. 27, 2018, both of which are incorporated by reference herein in their entirety.

The present invention relates to a non-linear optical scanning microscope and a method of inducing and detecting non-linear optical emission in a sample. The invention may be used for example in non-linear scanning optical microscopy, such as for multi-photon excited fluorescence microscopy (MFM) including two-photon excitation (TPE) microscopy.

BACKGROUND ART

In the field of optical scanning microscopy, in fluorescence microscopes, a laser illuminates a sample with excitation photons to cause fluorescence. An objective focuses excitation photons at a focal volume. The excitation photons are absorbed by fluorophores and fluorescence photons are emitted and detected. The focal volume is scanned across the sample to obtain an image of the emission.

Confocal fluorescence microscopes (CFMs) achieve a shallow depth of focus using a screen around a pinhole. The pinhole is at the location confocal with the focal volume. Fluorescence photons from the focal volume pass through the pinhole to a detector, while the screen rejects out-of-focus fluorescence photons by spatial filtering. A problem is that fluorescence photons from the focal volume can be scattered after their emission away from the pinhole and they are rejected inadvertently. This reduces image contrast.

A high signal-to-noise ratio is achieved by detecting from the same side as the illumination. This is called epifluorescence. It is convenient to use the same optical system both to focus and scan the illumination/excitation laser beam and to collect and descan the emitted fluorescence photons from the focal volume.

The first confocal laser scanning microscope was described in U.S. Pat. No. 2,343,015 A (Davidovits & Egger) which discloses an optical microscope suitable for scanning below the surface of specimens of low optical contrast and particularly for scanning buried tissues and cells. Optical means focus a beam of parallel light within the object and means are provided to scan by moving an objective lens system along two axes orthogonal to the optical axis. An image is generated in a cathode-ray tube.

Objective lens scanning has been used little since then. For example, in D K Hamilton and T Wilson, "Scanning optical microscopy by objective lens scanning", Journal of Physics E: Scientific Instruments, Volume 19, Number 1, 1986, pp 52-54, the authors present high resolution micrographs obtained with a scanning optical microscope where the scanning is achieved by mechanically scanning the objective. The authors suggested the approach was very important in the microscopy of heavy or awkwardly shaped objects.

A problem with objective scanning in confocal microscopes is poor performance, such as limited frame rate and scan area.

The frame rate is limited by the mass of the objective. Compound objectives, though useful for allowing a user to view and set up the sample, have a high mass, thus limit the frame rate with objective scanning. If an x-transducer has to carry and move the mass of a "piggy-backed" y-transducer to achieve combined x-y scanning, the result is again a limited frame rate because of the high mass that has to be scanned.

Because the problems with objective scanning outweigh the benefits, objective scanning became restricted to scanning the objective in the z-direction, for depth scanning.

Other approaches have been developed to achieve scanning in the sample plane. Early confocal laser microscopes scanned the sample stage. Subsequently, focal volume scanning has been performed by angular deflection of the illumination beam, for example using galvanometer scanned mirrors. Such "galvo" mirrors have been found preferable to objective scanning, because the mirrors are small and have low mass and can be scanned by rotation, with a linear approximation over a central range of movement. This is why compound objectives became ubiquitous in scanning optical microscopes. However, this approach requires a multi-lens objective to reduce aberrations to maintain focus while projecting the angle-scanned beam onto the sample plane. Another problem with gavlo mirrors is they are noisy and prolonged exposure to the high intensity sound at the mirror oscillation frequency can damage human hearing.

More recently, non-linear optical scanning microscopy has been developed, including multi-photon excited fluorescence microscopy (MFM). Two-photon excitation (TPE) microscopy is one example of this.

Denk, Strickler and Webb invented two-photon excitation microscopy. Their patent, U.S. Pat. No. 5,034,613 A (Cornell Res Foundation Inc), discloses a laser scanning microscope that produces molecular excitation in a target material by simultaneous absorption of two photons to thereby provide intrinsic three-dimensional resolution. Scanning of the excitation laser beam was performed by angular deflection of the illumination beam using scan mirrors and focusing was performed with an objective lens fixed in relation to the sample plane.

Rather than a single excitation photon of a given energy as in CFMs, in MFM two photons of half the energy (double the wavelength) can be used to cause fluorescence. That nonlinear process depends on the square of the intensity. The very high intensity illumination is achieved using mode locked pulsed lasers. The intensity is high enough for nonlinear fluorescence to occur in the focal volume, but not high enough for nonlinear fluorescence to occur outside the focal volume. So, there is no out-of-focus fluorescence that has to be rejected by spatial filtering. The confocal pinhole can be dispensed with, so these are not strictly confocal microscopes; the non-linear emission being only in the focal volume provides a "virtual pinhole".

The removal of the pinhole/screen allows collection and detection of fluorescence photons that are scattered after their emission, giving higher contrast. There is no need to descan the scanning movement of the focal volume to a stationary pinhole. The collected fluorescence photons can be detected directly, even while being defocused and/or scanned across a detector. More excitation photons get to the focal volume and can go deeper into a sample because they are not absorbed as they approach the focal volume and they are scattered less because of their longer wavelength. The longer wavelength also reduces harmful photobleaching and phototoxicity. These effects give high contrast in thick samples. Fluorescence only in the focal volume also means there is less harmful photobleaching and phototoxicity. Chemical reactions can be produced local to the focal volume. The longer excitation wavelength gives slightly less resolution than CFM.

Second-harmonic imaging microscopy (SHIM) is another form of non-linear optical scanning microscopy based on the nonlinear optical effect second-harmonic generation (SHG).

Coherent Anti-Stokes Raman Scattering (CARS) microscopy is another form of non-linear optical scanning microscopy that images intrinsic vibrational contrast of molecules in a sample.

Thus, conventional non-linear optical scanning microscopy uses spatial sampling using angular-scanned excitation laser beams. In conventional systems, many lenses are required in the objective to project the angular-scanned excitation laser beam arriving from different angles onto the sample plane with control of aberration. Having many lenses causes losses at the interfaces, therefore a high laser output is needed to excite the non-linear emission. Complex and expensive lasers are needed and much of the laser output is wasted.

In conventional MFM systems, the scan area is limited. To increase the scan area with angular scanning of the excitation radiation, large optical path geometries and expensive multi-element objectives are required, leading to large and expensive systems.

Kinematic flexure mechanisms are known for z-adjustment of microscope objectives in scanning optical microscopes.

Kinematic flexure mechanisms are also known sample stages. For example, Nanopositioning Technologies: Fundamentals and Applications, edited by Changhai Ru, Xinyu Liu, Yu Sun, page 67, discloses that a parallel-kinematic configuration can be used for non-raster scan of a sample platform using methods such as spiral-scan, cycloid-scan, and Lissajous-scan patterns.

A 3-D printed kinematic flexure stage is described in "On a simplified nonlinear analytical model for the characterisation and design optimisation of a compliant XY micro-motion stage", Xavier Herpe, Ross Walker, Matthew Dunnigan, Xianwen Kong, Robotics and Computer-Integrated Manufacturing 49 (2018) 66-76.

SUMMARY OF INVENTION

It is desirable to provide a non-linear optical scanning microscope and method of inducing and detecting non-linear optical emission in a sample that is less complex, lower cost, has a large working distance and covers a wide scan area.

According to a first aspect of the present invention, there is provided a non-linear optical scanning microscope for inducing non-linear optical emission in a sample using a pulsed laser illumination system operable to provide excitation radiation, the microscope comprising:
an objective configured to focus the excitation radiation, such that the illumination system and the objective are operable together to provide the excitation radiation in a focal volume at sufficient intensity to cause non-linear emission of emission radiation from the sample in the focal volume; and
an objective scanner operable to scan the objective in at least two dimensions so as to scan the emitting focal volume in corresponding dimensions.

Preferably, the objective is an aspheric objective. Preferably, the aspheric objective is configured to reduce spherical aberration, compared to spherical aberration of a spherical objective.

Preferably, the objective is configured to focus the excitation radiation without, or with minimal, spherical aberration.

Preferably, the objective comprises an optical element configured to focus the excitation radiation to a point without, or with minimal, spherical aberration.

Preferably, the objective comprises one or more optical element selected from the group of optical elements consisting of: aspheric lens, axicon and aspheric mirror.

Preferably, the objective scanner is operable to scan the objective in two dimensions transverse with respect to the objective's optical axis so as to scan the emitting focal volume in corresponding dimensions.

Preferably, the objective scanner is operable to scan the objective in a plane perpendicular to the objective's optical axis so as to scan the emitting focal volume in a corresponding sample plane.

Preferably, the objective scanner is operable to scan the objective from a scan range of 10 microns to a scan range of more than 1 mm.

Preferably, the objective scanner is operable to scan the objective to a scan range of more than 1 mm.

Preferably, the objective scanner is operable to scan the objective to a scan range of more than 5 mm.

Preferably, the objective scanner is operable to scan the objective to a scan range of more than 10 mm.

Preferably, the non-linear optical scanning microscope further comprises a detector operable to detect the emission radiation from the scanned focal volume and an image module configured to construct an image corresponding to the scan by the focal volume, based on the detected emission radiation.

Preferably, the objective comprises a single optical element.

Alternatively, the objective comprises a plurality of optical elements distributed perpendicular to the objective's optical axis.

Preferably, the illumination system is arranged with the objective to provide excitation radiation on-axis to the objective.

Preferably, the illumination system is arranged with the objective to provide diverging excitation radiation to the objective.

Preferably, the illumination system is configured to overfill the objective's aperture with excitation radiation.

Preferably, the objective scanner is operable to scan the objective in a Lissajous pattern.

Preferably, the non-linear optical scanning microscope comprises collection optics arranged to collect the emission radiation emitted along the optical axis of the objective.

Preferably, the non-linear optical scanning microscope comprises collection optics arranged to collect the emission radiation via the objective.

Preferably, the non-linear optical scanning microscope comprises collection optics arranged to collect the emission radiation emitted off the optical axis of the objective and away from excitation radiation exiting the focal volume.

Preferably, the non-linear emission comprises multiphoton fluorescence emission.

Preferably, the non-linear emission comprises second or third harmonic generation emission.

Preferably, the non-linear emission comprises coherent anti-Stokes Raman emission.

Preferably, the objective scanner comprises a kinematic flexure mechanism.

Preferably, the kinematic flexure mechanism is configured to kinematically decouple actuators respectively corresponding to the two dimensions.

Preferably, the kinematic flexure mechanism is a unitary 3D-printed member.

Preferably, the kinematic flexure mechanism comprises a rigid exterior frame surrounding, in a plane of the two dimensions, interior beam flexures that support the objective.

Preferably, the interior beam flexures are actuated through holes in the rigid exterior frame.

Preferably, the non-linear optical scanning microscope further comprises an optical position sensor integrated into the kinematic flexure mechanism.

According to a second aspect of the present invention, there is provided a method of inducing and detecting non-linear optical emission in a sample, the method comprising:
providing excitation radiation,
focussing the excitation radiation using an objective to provide the excitation radiation in a focal volume at sufficient intensity to cause non-linear emission of emission radiation from the sample in the focal volume;
scanning the objective in at least two dimensions so as to scan the emitting focal volume in corresponding dimensions; and
detecting the emission radiation from the scanned focal volume.

Preferably, focussing the excitation radiation comprises focussing the excitation radiation using an aspheric objective. Preferably, focussing the excitation radiation comprises focussing the excitation radiation using an aspheric objective configured to reduce spherical aberration, compared to spherical aberration of a spherical objective.

Preferably, focussing the excitation radiation comprises focusing the excitation radiation without, or with minimal, spherical aberration.

Preferably, focussing the excitation radiation comprises focusing the excitation radiation to a point without spherical aberration.

Preferably, the method comprises focussing the excitation radiation using one or more optical element selected from the group of optical elements consisting of: aspheric lens, axicon and aspheric mirror.

Preferably, scanning the objective in at least two dimensions comprises scanning the objective in two dimensions transverse to the objective's optical axis so as to scan the emitting focal volume in corresponding dimensions.

Preferably, scanning the objective in at least two dimensions comprises scanning the objective in a plane perpendicular to the objective's optical axis so as to scan the emitting focal volume in a corresponding sample plane.

Preferably, scanning the objective comprises scanning the objective from a scan range of 10 microns to a scan range of more than 1 mm.

Preferably, scanning the objective comprises scanning the objective from a scan range of 10 microns to a scan range of more than 1 mm.

Preferably, scanning the objective comprises scanning the objective to a scan range of more than 1 mm.

Preferably, scanning the objective comprises scanning the objective to a scan range of more than 5 mm.

Preferably, scanning the objective comprises scanning the objective to a scan range of more than 10 mm.

Preferably, the method further comprises constructing an image corresponding to the scan by the focal volume, based on the detected emission radiation.

Preferably, the method comprises focussing the excitation radiation using a single optical element.

Alternatively, the method comprises focussing the excitation radiation using a plurality of optical elements distributed perpendicular to the objective's optical axis.

Preferably, the method comprises providing excitation radiation on-axis to the objective.

Preferably, the method comprises providing diverging excitation radiation to the objective.

Preferably, the method comprises overfilling the objective's aperture with excitation radiation.

Preferably, the method comprises scanning the objective in a Lissajous pattern.

Preferably, the method comprises collecting the emission radiation emitted along the optical axis of the objective.

Preferably, the method comprises collecting the emission radiation via the objective.

Preferably, the method comprises collecting the emission radiation emitted off the optical axis of the objective and away from excitation radiation exiting the focal volume.

Preferably, the non-linear emission comprises multiphoton fluorescence emission.

Preferably, the non-linear emission comprises second or third harmonic generation emission.

Preferably, the non-linear emission comprises coherent anti-Stokes Raman emission.

BRIEF DESCRIPTION OF DRAWINGS

Embodiments of the present invention will now be described, by way of example only, with reference to the drawings, in which:

FIGS. 9(a), 9(b), and 9(c) illustrate, in schematic form, a kinematic flexure mechanism for objective scanning in accordance with an embodiment of the present invention;

DESCRIPTION OF EMBODIMENTS

Figure 1:
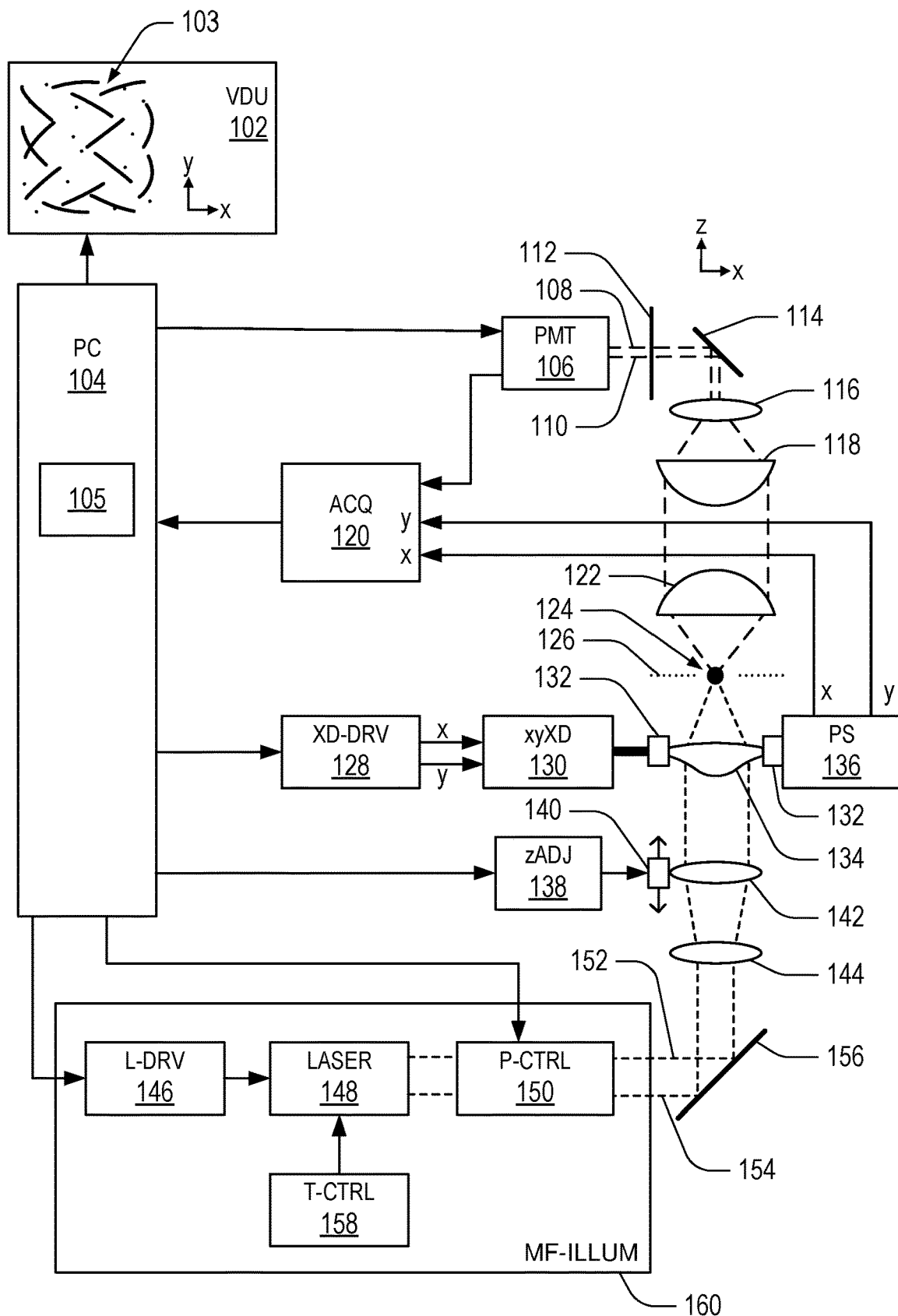
FIG. 1 illustrates, in schematic form, a multi-photon fluorescence objective-scanning microscope according to an embodiment of the present invention.

Embodiments provide an objective-scanning microscope, for example a multiphoton fluorescence microscope that has objective lens scanning combined with non-linear excitation.

Embodiments avoid using angular-scanned laser beams with a compound microscope objective to provide an image in the transverse (x-y) plane. Instead, embodiments offer a much simpler optical system by scanning a single aspheric objective lens directly in the transverse (x-y) plane. A large excitation laser beam of sufficient uniformity and largely filling or overfilling the objective lens' aperture may also be applied. This ensures that the "light spot" characteristics generated by the aspheric lens is hardly or not at all a function of the lens's position, and provides a large, aberration-independent scan area.

In the Figures, elements labelled with reference numerals found in preceding Figures represent the same elements as described for the respective preceding Figure. For example, objective 134 in FIG. 2 would be described in the same way as objective 134 in FIG. 1.

FIG. 1 illustrates, in schematic form, a multi-photon fluorescence objective-scanning microscope according to an embodiment of the present invention. This is an example of a non-linear optical scanning microscope. A pulsed laser illumination system 160 is operable to provide excitation radiation, in the form of an excitation laser beam depicted by rays 152 and 154 shown at the extents of the laser beam.

The multiphoton fluorescence illumination system (MF-ILLUM) 160 in this example includes a laser driver (L-DRV) 146 and an ultrafast laser (LASER) 148. A personal computer (PC) 104, having a visual display unit (VDU) 102, controls the laser driver (L-DRV) 146 and an excitation beam power control (P-CTRL) module 150. The laser 148 also has a temperature-control (T-CTRL) module 158.

This example uses 1050 nm laser as this is a convenient wavelength to produce an ultrafast laser pulse. Embodiments may be provided with low-cost fixed wavelength ultrafast lasers operating at key application wavelengths. Multiple lasers operating simultaneously may be provided, for example giving access to different imaging modalities and multiple fluorophores. A key laser wavelength range is one suitable to be used for applications with green fluorescent protein (GFP) samples. This wavelength is provided in conventional MFM systems using an expensive widely tuneable Ti:Sapphire laser. However, embodiments of the present invention can induce non-linear emission with a lower power laser, because of reduced losses in the scanned objective. A suitable laser power is 400 mW. Typically, 1-3 W of power is available from the lasers used for conventional non-linear microscopes, however in the clear majority of instances only 1-10 s of mW are used at the sample. Lower-power lasers are less expensive and do not require water cooling.

A suitable laser pulse is in the ultrafast regime, typically from single fs up to single ps width. Pulse duration and spectral width can be selected to balance the bandwidth to suit the application. This may be reduced to 200 fs±50 fs, which offers a compromise between short pulses that give good signal levels and system dispersion that will broaden the pulse and therefore require pre-compensation systems to be added to the system. Furthermore, 200 fs pulses typically have around 5 nm bandwidth, therefore reducing the pulse width will increase the optical pulse bandwidth and result in systems with reduced optical filter tolerances.

A suitable pulse repetition rate (rep rate) for the excitation radiation produced by the laser 148 is 160 MHz. Typically, an 80 MHz rate may be used but rep rates as low as kHz may be used. For a fixed pulse width, the peak power will be higher at lower rep rates.

A pulsed laser provides high temporal intensity in a small emission volume. This leads to non-linear emission, so the pinhole is not required. Consequently, the system can collect in-focus but scattered emission photons and can collect more emission (giving better contrast) with flexible geometries (for example avoiding descanning).

The non-linear approach provides deep penetration in the sample because of reduced or no absorption of longer-wavelength excitation photons. There is less photobleaching and less phototoxicity because there is less out-of-focus fluorescence. Deep penetration is also provided because there is less scattering of longer-wavelength excitation photons.

However, with non-linear emission microscopes, resolution is reduced because of the longer excitation photon wavelength. Embodiments of the present invention use on-axis illumination of the objective, which reduces aberration and therefore mitigates this disadvantage. The use of an aspheric objective further reduces the aberration so as to further mitigate the abovementioned disadvantage. The aspheric objective is configured to reduce spherical aberration, compared to spherical aberration of a spherical objective, such as a simple spherical lens or a spherical mirror.

The power control (P-CTRL) module 150 in this example comprises a half-wave plate in conjunction with a polariser to provide variable attenuation of the laser power. A variable ND filter could be used but may distort the beam. The purpose of the variable attenuator is that it allows the ultrafast laser 148 to be run at a constant power which ensures stability of its operating parameters.

The excitation laser beam 152, 154 is reflected off a mirror 156 into alignment with the optical axis of the objective lens 134. Thus, the illumination system 160 is arranged with the objective lens 134 to provide excitation radiation on-axis to the objective lens. The on-axis illumination and aspheric lens scanning allow non-linear emission using a low power laser with a low-complexity optical system, as compared to off-axis angular-scanned illumination through a compound objective. Alternatively or in addition, an axicon may be used for the objective. An axicon has a conical profile and focuses light into non-diffractive Bessel beam. This has the advantage of increased resolution. An axicon objective may be useful for example for surface imaging in a Raman scanning microscope.

A telescope comprising lenses 142, 144 is used to ensure effective use of the numerical aperture (NA) of the objective lens 134 and provide a small focal volume 124 at the focal point of the objective lens 134. Therefore, the excitation laser beam 152, 154 is expanded by the telescope 142, 144 to largely fill the aperture of objective 134 with collimated on-axis illumination radiation.

Furthermore, the telescope may be configured to provide sectioning in the z-axis, negating the need to physically move either the objective lens or the sample for depth scanning. This may be achieved by changing the distance between the two telescope lenses using a z-adjust (zADJ) actuator 138 connected to the mount 140 of one of the telescope lenses 142. The actuator is controlled by the PC 104 to either slightly focus or de-focus the beam arriving at the objective lens 134. The beam exiting the objective lens then focuses either above or below the "collimated" beam focal point.

The objective in this example is an optical element comprising a single aspheric lens (or asphere) 134, which is used to focus the incoming excitation laser beam to a point 124 in the sample plane 126 without (or with minimal) spherical aberration. Minimal spherical aberration means that the spherical aberration is reduced to being as small as possible by the configuration of the aspheric objective. Aspheric lenses can generate a diffraction-limited spot at a monochromatic wavelength. These lenses have low mass and are compact and can have large numerical apertures. In this example, a suitable lens is a 15 mm diameter aspheric lens with a 12 mm focal length and a 0.55 NA. Because the aspheric lens has a low mass, it may be scanned rapidly by the objective scanner. Its mass can be kept particularly low by using a single aspheric lens. The aspheric objective (in this example a lens, but in other examples a mirror or axicon) may have a mass of less than 30 g, preferably less than 20 g.

Having fewer lenses results in fewer transmission losses at the interfaces, therefore a lower laser output is able to excite the non-linear emission, so a lower-cost laser can be used. Furthermore, because it provides less aberration, an aspheric objective provides a smaller focal volume with increased excitation photon intensity, thus it further facilitates use of a lower-cost laser with further reduced laser output to excite non-linear emission.

Figure 7:
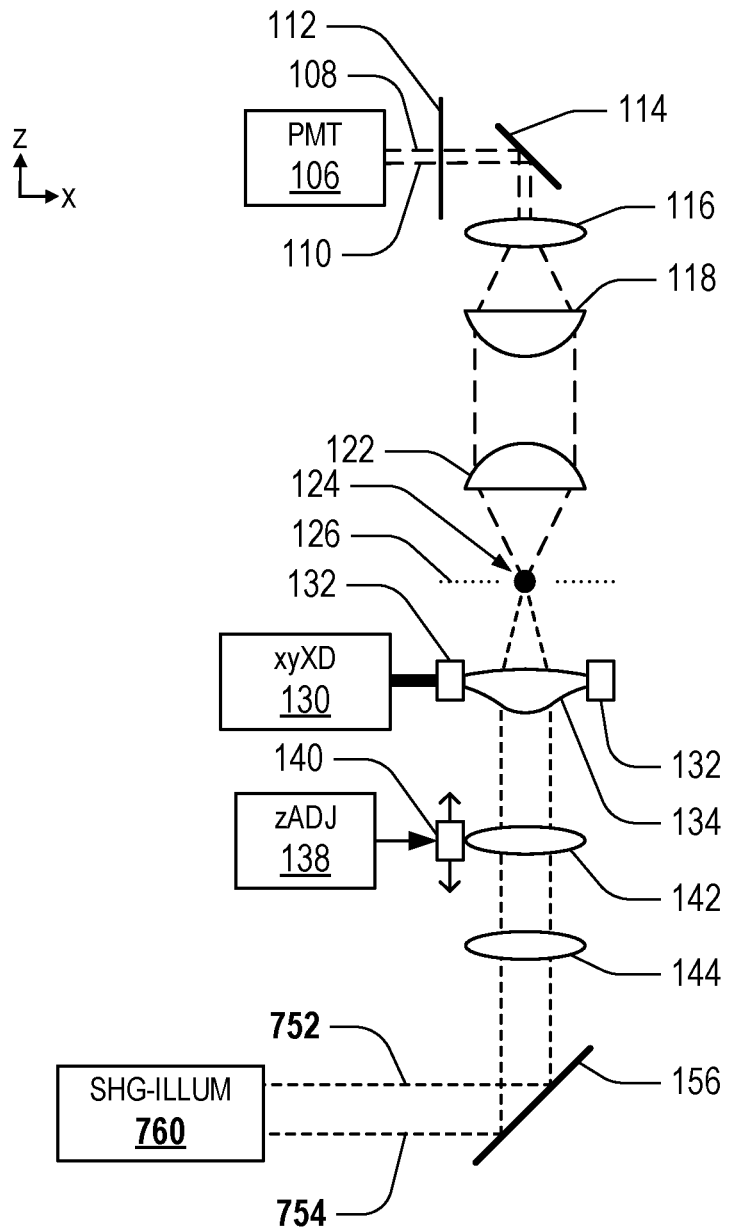
FIG. 7 illustrates, in schematic form, an SHG objective-scanning microscope according to an embodiment of the present invention.
Figure 8:
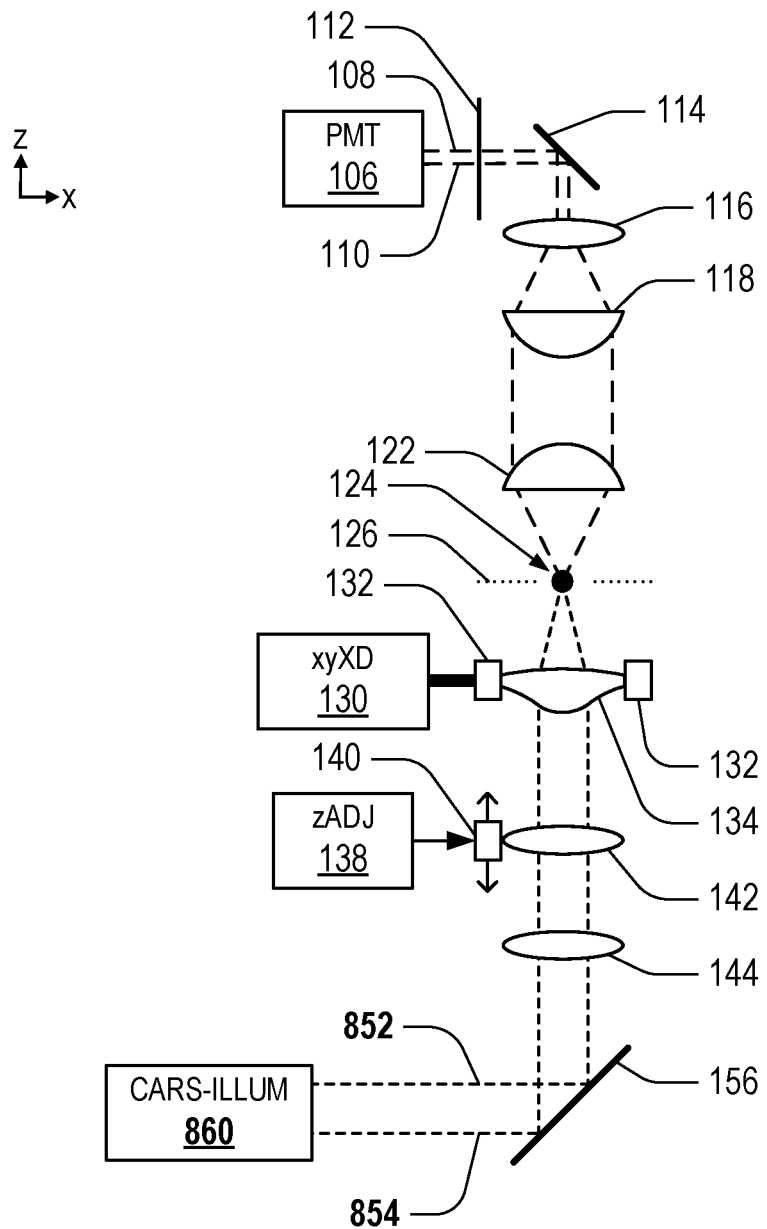
FIG. 8 illustrates, in schematic form, a CARS objective-scanning microscope according to an embodiment of the present invention.

The illumination system 160 and the aspheric objective lens 134 are operable together to provide the excitation radiation 152, 154 in a focal volume 124 at sufficient intensity to cause non-linear emission of emission radiation from the sample (not shown) in the focal volume. This non-linear emission is multiphoton fluorescence emission, but other embodiments described with reference to FIGS. 7 and 8 show microscopes for different types of non-linear emission.

The objective lens 134 is scanned by an objective scanner 130, 132. In this example an x-y transducer (xyXD) 130 is connected to a kinematic flexure mechanism 132 which acts as a scanning lens mount. The kinematic flexure mechanism is described with reference to FIGS. 9 and 10. The x-y transducer 130 is provided with x and y control signals by a transducer driver (XD-DRV) 128, which is controlled by the PC 104. The objective scanner is thus operable to scan the objective in two dimensions transverse to the objective's optical axis, which here correspond to the x and y directions. The objective scanner may also scan the objective in a third dimension, corresponding to the z direction. In this example, the two directions are orthogonal to each other and the objective's optical axis. The scan is linear in each direction, resulting in scanning of the focal volume in a sample plane. In other examples, the objective and therefore focal volume scan may be in non-orthogonal directions and/or in paths that are not linear, such as along curved paths, for example to provide a curved sampling surface.

The x-y transducer 130 may be split into separate independent x- and y-transducers, as described with reference to FIG. 10. The actuation may be done in various ways such as using electromechanical or piezoelectric transducers.

The x-y transducers 130 are coupled to the objective lens 134 by the kinematic flexure mechanism 132. The objective scanner 130, 132 is operable to scan the objective in a plane perpendicular to the objective lens' optical axis so as to scan the emitting focal volume 124 in a corresponding sample plane 126.

The objective scanner may be operable to scan the objective in a Lissajous pattern, which provides a high frame-rate. A Lissajous scan allows the same moderate scan rate in both scan directions, with less extreme acceleration and deceleration of the objective.

Position sensors (PS) 136 in this example are monolithically integrated (shown in FIG. 9) into the objective scanner. The position sensors (PS) 136 output their x and y electrical signals to the acquisition (ACQ) module 120, which outputs to the PC 104.

The objective scanner can move the objective 10 s of microns up to a few millimetres (preferably more than 1 mm), which is effectively the field of view (FOV) of the system. Thus, the objective scanner is operable to scan the objective from a scan range of 10 microns to a scan range of more than 1 mm, or more than 5 mm, or more than 10 mm. This variable scan range has the advantage of not requiring the switching of objectives to zoom the field of view. The scan range may be sampled with a resolution up to a limit determined by the focal volume size and the Nyquist criterion. The optical resolution is independent of the FOV and the working distance, however in conventional systems this is not the case since to get a smaller spot generally requires an optical system that has a smaller working distance and FOV. Thus, embodiments provide not only a large working distance (say 12 mm) but also at the same time a large FOV. The large field of view is useful irrespective of the variable scan range, with the objective scanner being operable to scan the objective to a scan range of more than 1 mm, or more than 5 mm, or more than 10 mm For the collection optics, large-diameter high-NA condenser lenses 122 and 118 collect the optical emission signal generated by the sample. These lenses provide a large signal collection aperture whilst simultaneously providing a large working distance from the sample. There is also a collimating lens 116 between the detector 106 and the second condenser lens 118. This collimates the signal beam, illustrated by outer rays 108 and 110, which allows interference filters 112 and dichroic optics 114 to be optimally inserted into the optical path. In this example, the condenser lenses 118 and 122 are both 75 mm diameter aspheric lenses with a 50 mm focal length and a 0.6 NA.

In this and some other figures, the transmitted excitation radiation exiting the sample is not shown. It passes through lenses 122, 118 and 116, then passes through dichroic beam splitter 114. Its intensity may then be measured to correct the detected emission signal to compensate for illumination fluctuation.

The detector 106 is operable to detect the emission radiation 108,110 from the scanned focal volume 124. In this example, the detector is a photomultiplier tube (PMT) selected to detect signals of a particular wavelength emitted by the sample. Typically, the PMT works in conjunction with carefully selected filters 112. These filters isolate signals from the emitted radiation, in this example fluorescence emission. The fluorescence emission signal may also come from different fluorescence markers so may have different wavelengths. These can be detected by selecting appropriate filters.

The PMT 106 is controlled by the PC 104 and outputs its electrical signal to the acquisition (ACQ) module 120, which in turn outputs to the PC 104.

The PC 104 has an image module 105 in its software configured to construct an image corresponding to the scan of the focal volume, based on the detected emission radiation. The module uses the signals received from acquisition module 120, arising from the PMT 106 signal and the PS 136 signals, to construct the image.

The image may be stored and displayed 103 in real-time on the display unit 102. In an alternative example, the acquisition module may be an oscilloscope, which constructs and displays the image directly.

Figure 2:
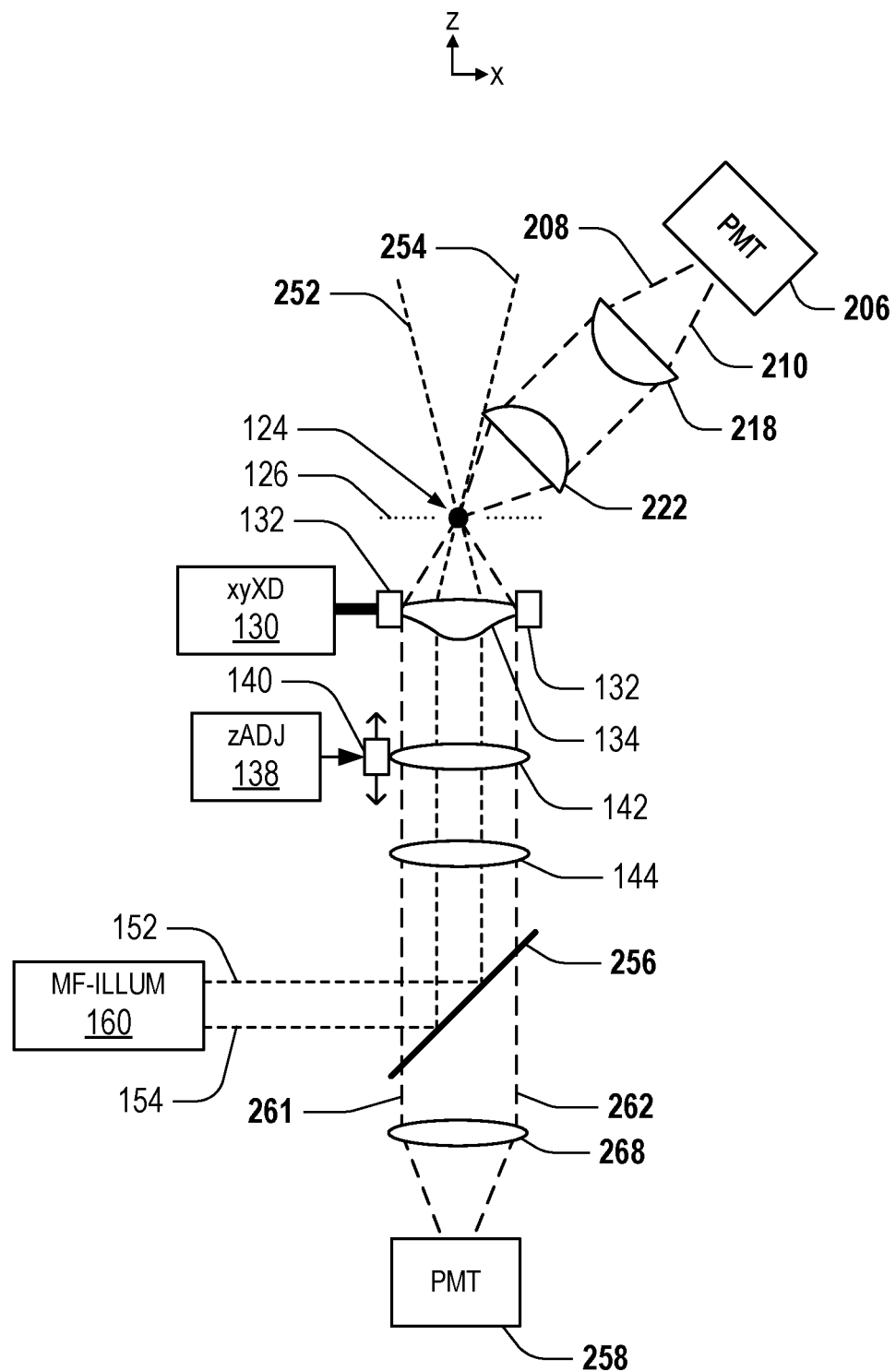
FIG. 2 illustrates, in schematic form, a multi-photon fluorescence objective-scanning microscope with off-axis and descanned emission collection according to an embodiment of the present invention.

FIG. 2 illustrates, in schematic form, a multi-photon fluorescence objective-scanning microscope with off-axis and descanned emission collection according to an embodiment of the present invention. The PMT 206 and collection optics 218, 222 are arranged off the optical axis of the objective and collect emission radiation emitted away from excitation radiation 252, 254 exiting the focal volume, to collect emission radiation 208, 210.

Another PMT 258 is arranged with lens 268 to collect descanned emission radiation via the objective. The dichroic beam splitter 256 allows the emitted fluorescence photons 261, 262 to pass to the PMT 258. As mentioned above, a high signal-to-noise ratio is achieved by detecting from the same side as the illumination (i.e. epifluorescence). The same optical system 134, 142, 144 is used both to focus and scan the excitation laser beam and to collect and descan the emitted fluorescence photons from the focal volume 124.

Although FIG. 2 shows two types of collection, they could be used separately, or combined together or alone with the on-axis transmitted detection shown in FIG. 1.

Figure 3:
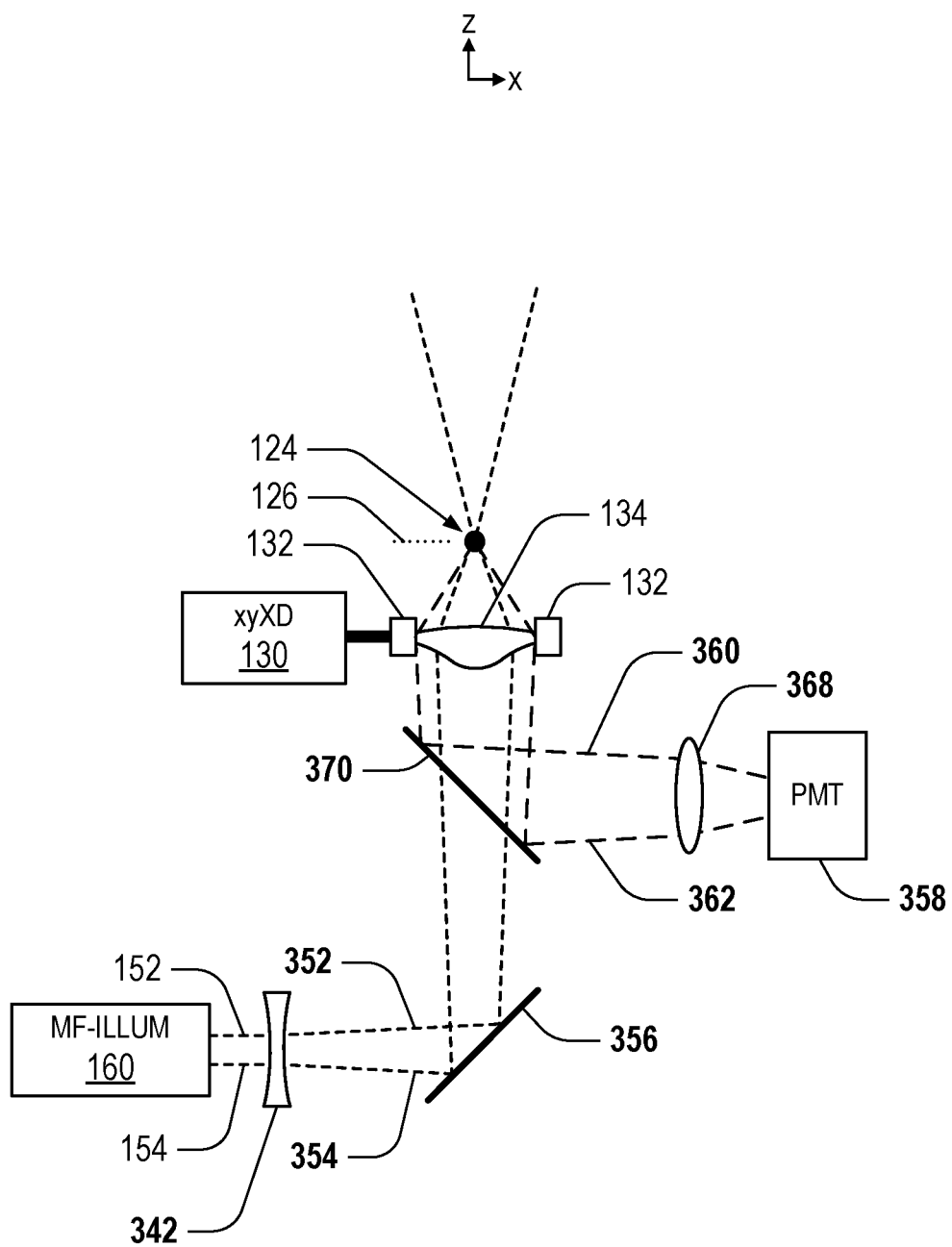
FIG. 3 illustrates, in schematic form, a multi-photon fluorescence objective-scanning microscope with diverging objective illumination and descanned emission collection according to an embodiment of the present invention.

FIG. 3 illustrates, in schematic form, a multi-photon fluorescence objective-scanning microscope with diverging objective illumination and descanned emission collection according to an embodiment of the present invention.

A negative lens 342 is used to diverge the excitation laser beam 152, 154 into a diverging illumination laser beam depicted by rays 352 and 354 shown at the extents of the diverging beam. The diverging beam 352, 354 is reflected off a mirror 356 into alignment with the optical axis of the objective lens 134. Instead of a negative lens 342, another optical element or system, may be used provide a diverging beam. For example, a positive lens could focus the illumination beam through a point to provide a diverging beam. The advantage of the diverging beam is that it is simple to align on-axis illumination onto the objective while filling a large portion (or overfilling) the objective.

A PMT 358 is arranged with lens 368 to collect descanned emission radiation via the objective 134. The dichroic beam splitter 370 deflects the emitted fluorescence photons 360, 362 to the PMT 358, while passing the excitation radiation of the illumination beam. As mentioned above, a high signal-to-noise ratio is achieved by detecting from the same side as the illumination (i.e. epifluorescence). Like shown in FIG. 2, the same optical system 134 is used both to focus and scan the excitation laser beam and to collect and descan the emitted fluorescence photons from the focal volume 124.

Although FIG. 3 shows just descanned collection, it could be used separately, or combined together with one or more of the off-axis detection shown in FIG. 2 and the on-axis transmitted detection shown in FIG. 1.

Figure 4:
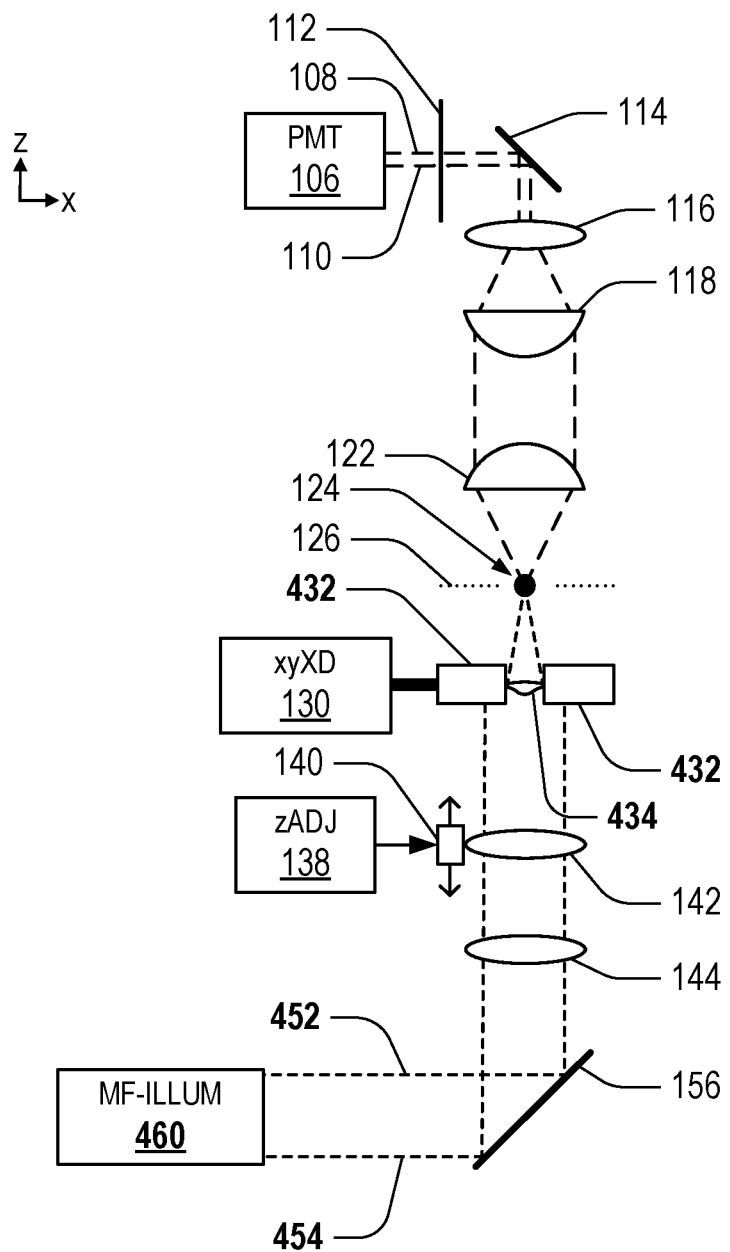
FIG. 4 illustrates, in schematic form, a multi-photon fluorescence objective-scanning microscope with overfilled objective aperture illumination according to an embodiment of the present invention.

FIG. 4 illustrates, in schematic form, a multi-photon fluorescence objective-scanning microscope with an overfilled objective aperture according to an embodiment of the present invention. The illumination system 460 with telescope 142, 144 is configured to overfill the aperture of the objective 434 with excitation radiation 452, 454. Alternatively, for example, a diverging illumination beam as shown in FIG. 3 may be used to overfill the aperture. In this example the aperture is defined by the extent of the mount 432. However, in other examples, an iris could be used to define the aperture. This allows a large scan area, with the objective being scanned across the illumination beam while its aperture is fully filled with on-axis radiation. This makes the focal volume well focused with a consistent intensity, sufficient for non-linear emission, over a large scan area. This is something complex and expensive to achieve with a conventional angular-scanned laser focused through a compound objective.

Figure 5:
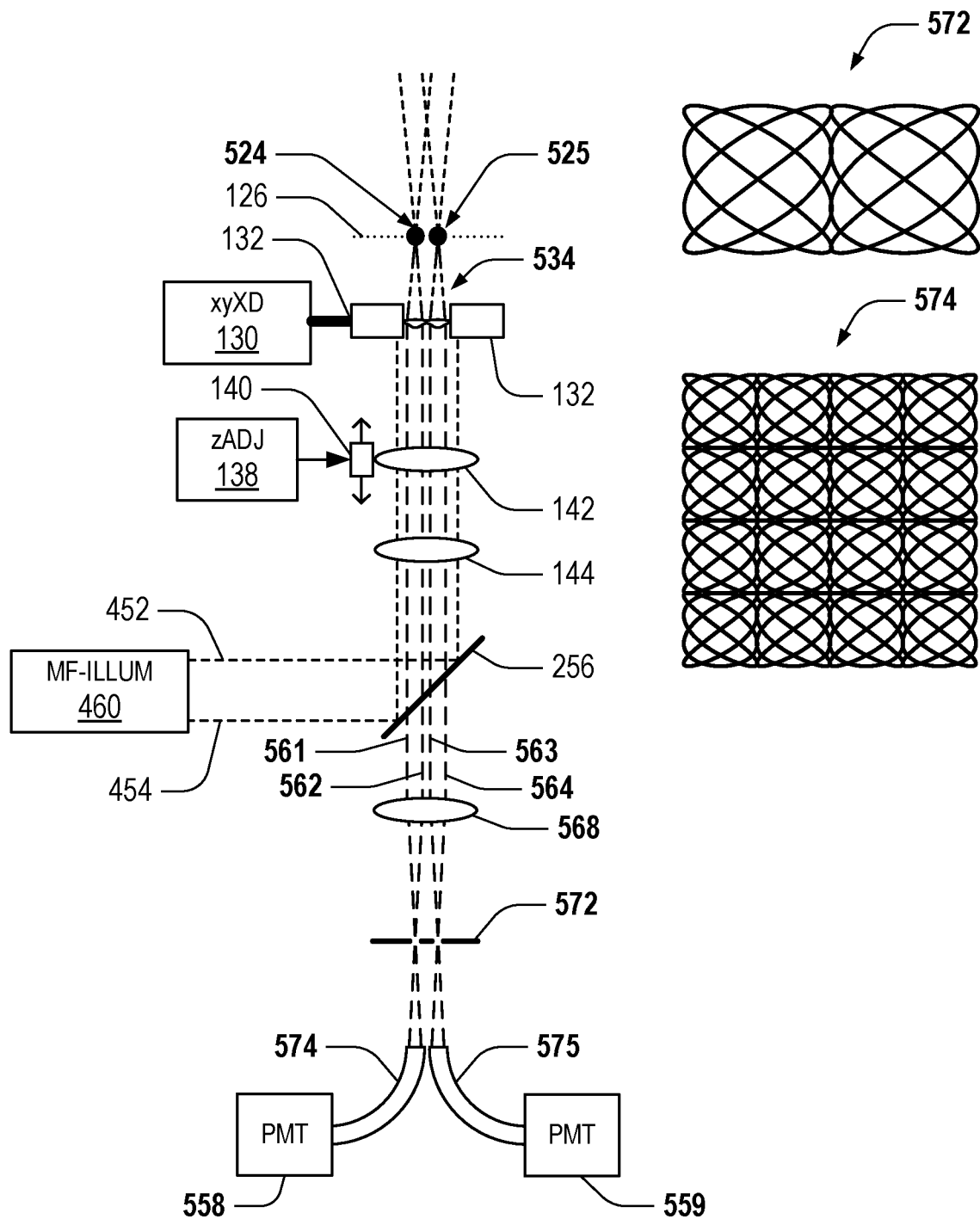
FIG. 5 illustrates, in schematic form, a multi-photon fluorescence objective-scanning microscope with multiple objectives according to an embodiment of the present invention.

FIG. 5 illustrates, in schematic form, a multi-photon fluorescence objective-scanning microscope with multiple objectives according to an embodiment of the present invention.

As an objective, a plurality of optical elements 534 are provided distributed perpendicular to the objective's optical axis, in this example side-by side. The optical elements may be aspheric lenses, axicons or aspheric mirrors. The optical elements are configured to focus the excitation radiation to a plurality of points 524, 525 without spherical aberration. In the case of axicons, the points are extended into lines along the optical axis. The plurality of optical elements may have different focal lengths, allowing simultaneous depth profiling by scanning different depths at the same time.

Like for FIG. 4, the illumination system 460 with telescope 142, 144 is configured to overfill the aperture of the objective 534 with excitation radiation 452, 454. Alternatively, for example, a diverging illumination beam as shown in FIG. 3 may be used to overfill the aperture.

As mentioned above, a high signal-to-noise ratio is achieved by detecting from the same side as the illumination (i.e. epifluorescence). The same optical system 534, 142, 144 is used both to focus and scan the excitation laser beam and to collect and descan the emitted fluorescence photons from the focal volumes 524 and 525.

A plurality of PMTs 558 and 559 are arranged with optical system 568, 572, 574, 575 to collect descanned emission radiation 561, 562 and 563, 564 via the objective 534, separately for each focal volume 524, 525.

The dichroic beam splitter 256 allows the emitted fluorescence photons to pass to the PMTs 558 and 558. The lens assembly 568 conveys the first beam of emission radiation 561, 562 from the first focal volume 524 to a screen 572. The lens assembly 568 also conveys a second beam of emission radiation 563, 564 from the second focal volume 525 to the screen 572. A pair of pinholes in the screen 572 corresponding to the two focal volumes 524, 525 separately pass emission radiation from the respective focal volumes. In this example optical fibres 574 and 575 convey the separately collected emission radiation to the different respective PMTs 558, 559. With the output from the position sensor and a stored value for the offset between the multiple elements of the objective 534, two output signals from the photomultiplier can be positioned side by side for display. If the scan of the objective extends to the same distance as the offset, then a large contiguous area can be scanned, as illustrated by the tiled Lissajous patterns 572. More than two optical elements can be arranged side-by-side as the objective. For example, a scanned array of 4×4 aspheric lenses can result in a tiled scan area as shown by 574.

Not only is a larged tiled scan area provided, but also a fast scan is possible. This is because a relatively thin refractive multi-element objective has less mass compared to a single refractive objective. The lighter elements can be scanned faster because of their lower mass.

The multiple optical elements may be formed in one piece, such as a multi-lens array or as sub-shapes or facets on a mirrored surface.

Figure 6:
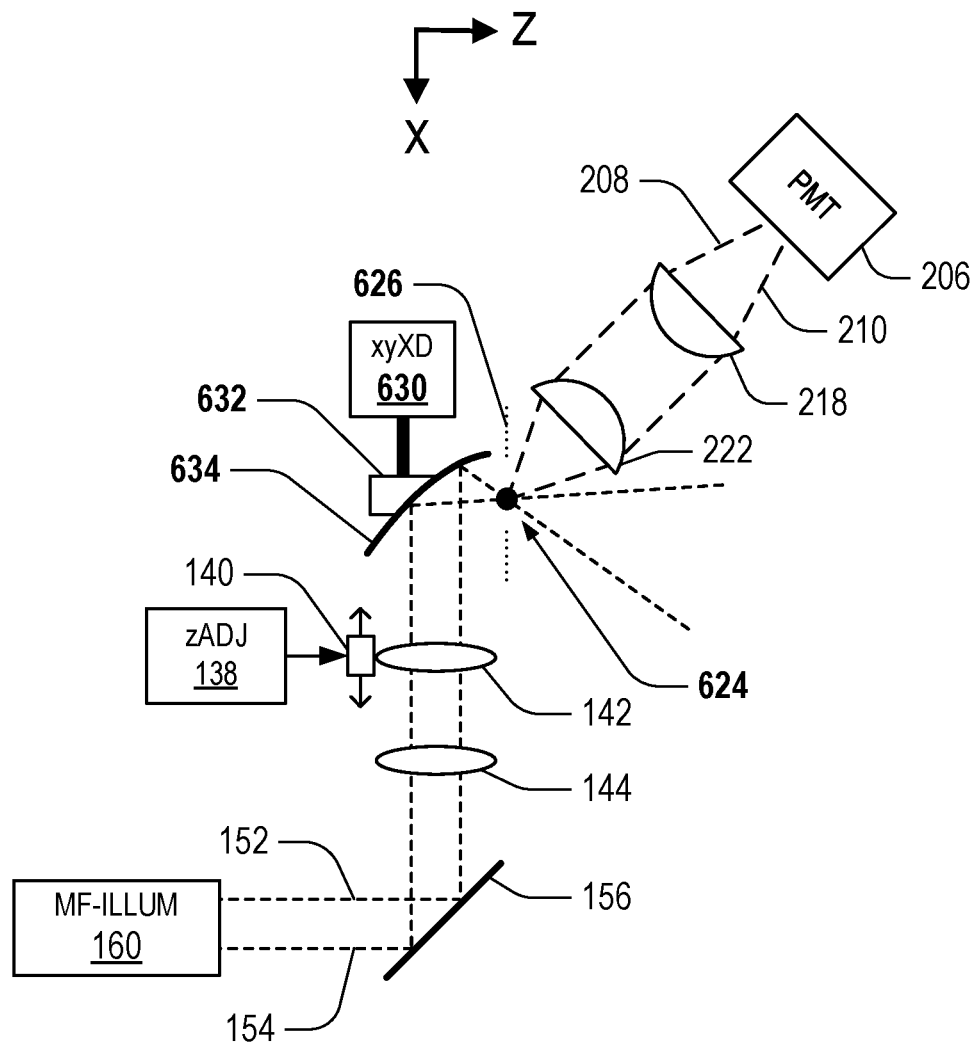
FIG. 6 illustrates, in schematic form, a multi-photon fluorescence objective-scanning microscope with an aspheric mirror objective according to an embodiment of the present invention.

FIG. 6 illustrates, in schematic form, a multi-photon fluorescence objective-scanning microscope with an aspheric mirror objective according to an embodiment of the present invention. In contrast to FIGS. 1 to 5, the x and z axes are rotated so that the sample plane 626 is shown as a vertical line. The illumination system 160 and the objective mirror 634 are operable together to provide the excitation radiation 152, 154 in a focal volume 624 at sufficient intensity to cause non-linear emission of emission radiation from the sample (not shown) in the focal volume. This non-linear emission is multiphoton fluorescence emission, but other embodiments described with reference to FIGS. 7 and 8 show microscopes for different types of non-linear emission, which may also use a mirror objective. The objective may also combine one or more lens and mirror.

The objective mirror 634 is scanned by an objective scanner 630, 632. In this example an x-y transducer (xyXD) 630 connected to a mirror mount 632 such as a kinematic flexure mount as described with reference to FIGS. 9 and 10.

FIG. 7 illustrates, in schematic form, a non-linear SHG objective-scanning microscope with according to an embodiment of the present invention. In this embodiment, a second harmonic generation illumination system (SHG-ILLUM) 760 is used to provide excitation radiation 752, 754. The non-linear emission in this embodiment is second harmonic generation emission.

FIG. 8 illustrates, in schematic form, a non-linear CARS objective-scanning microscope according to an embodiment of the present invention. In this embodiment, a coherent anti-Stokes Raman emission illumination system (CARS-ILLUM) 860 is used to provide excitation radiation 852, 854. The non-linear emission in this embodiment is coherent anti-Stokes Raman emission.

Different illumination systems, such as combinations of multiphoton fluorescence, SHG or CARS illumination systems may be combined in the same non-linear objective scanning microscope. The different illumination systems described herein may be combined with different detection arrangements described herein, such as those described with reference to FIGS. 1, 2 and 3.

Using a kinematic flexure mechanism as a sample stage in a scanning microscope does not solve any of the problems described above with respect to angular-scanned excitation laser beams. However, the inventors have realised that instead of using the kinematic flexure mechanism for a sample stage, it can be used as an objective scanner. Thus the benefits of a kinematic flexure mechanism, such as no backlash, no friction, low noise, simplicity and low cost, can be accrued for an objective scanner.

FIG. 9 illustrates, in schematic form, a kinematic flexure mechanism for objective scanning in accordance with an embodiment of the present invention. FIG. 9(a) shows a kinematic flexure mechanism 902 that is a unitary 3D-printed member. As such it does not need assembly, and there are no joints to come unattached, so it is low-cost and reliable. FIG. 9(b) shows a cross section along the line A-A of FIG. 9(a). FIG. 9(c) is a projection view of the kinematic flexure mechanism 902. FIGS. 9(b) and 9(c) also include an actuator rod 914.

The kinematic flexure mechanism is configured to kinematically decouple actuators respectively corresponding to two dimensions, in this example x and y.

A rigid exterior frame 904 surrounds, in the x-y plane, interior beam flexures 906 that support the objective. An objective hole 908 is provided to mount the objective on the flexure beams. Unlike sample stages, the hole allows light to pass through the kinematic flexure mechanism, via the objective. The interior beam flexures 906 are actuated through holes 910 in the rigid exterior frame. An actuator rod 914 passes through the frame hole and is attached to an interior beam flexure 906 just inside the frame hole. The outer end of the actuator rod may have a magnet to attach it to a loudspeaker voice coil actuator, as described with reference to FIG. 10 below.

An optical position sensor (OPS) 912 is integrated into the kinematic flexure mechanism. A suitable position sensor is optical and includes a light-emitting diode (LED), a photo-diode and a variable shutter monolithically integrated into the kinematic flexure mechanism. FIG. 9(b) shows a cross section of the OPS. Extending from the interior beam flexure 906 within the OPS is a shutter 907. The end of the shutter intersects a light beam from the LED 916 to a photodiode 918.

Directly integrating measurement of the position of the scanned objective is beneficial to the imaging system. This enables system phase, nonlinearity, hysteresis and cycle repeatability issues to be circumvented by providing a direct read out of the actual stage position. Such a position sensor is low cost, fast, accurate and non-contact. The wavelength of the active LED may be optimally selected so as not to provide an optical output that can be detected by any of the PMTs. For example, the LED may have a longer wavelength than the PMT can detect around 950 nm. This provides simple and effective system control. There are alternative ways to provide a signal detailing the axes position and these include capacitive, magnetic, resistive and optical means.

Figure 10:
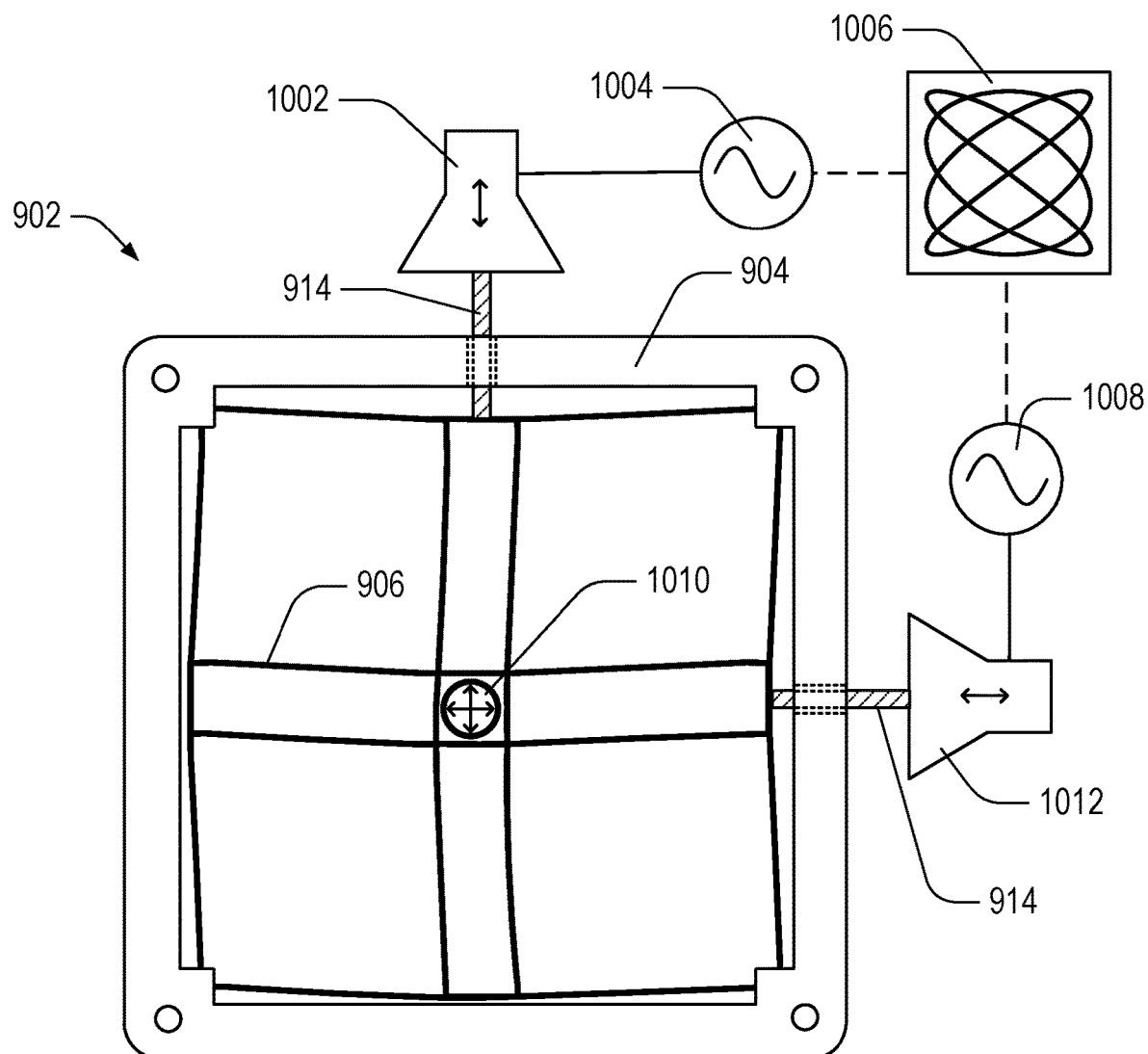
FIG. 10 illustrates, in schematic form, operation of a kinematic flexure mechanism by actuators for objective scanning in accordance with an embodiment of the present invention.

FIG. 10 illustrates, in schematic form, operation of a kinematic flexure mechanism by actuators for objective scanning in accordance with an embodiment of the present invention. The objective 1010 is mounted in the hole 908 shown in FIG. 9. The actuator rods 914 pass through the holes in the frame and are attached to the interior beam flexures 906 just inside each respective frame hole. The outer end of the actuator rods are attached to loudspeaker voice coil actuators 1002 and 1012. The actuators 1002, 1012 are driven by sources 1004 and 1008 with signals configured to produce a Lissajous pattern, shown schematically ay 1006.

The kinematic flexure mechanism described with reference to FIGS. 9 and 10 can be used as the objective scanner in any of the microscope configurations described herein.

Figure 11:
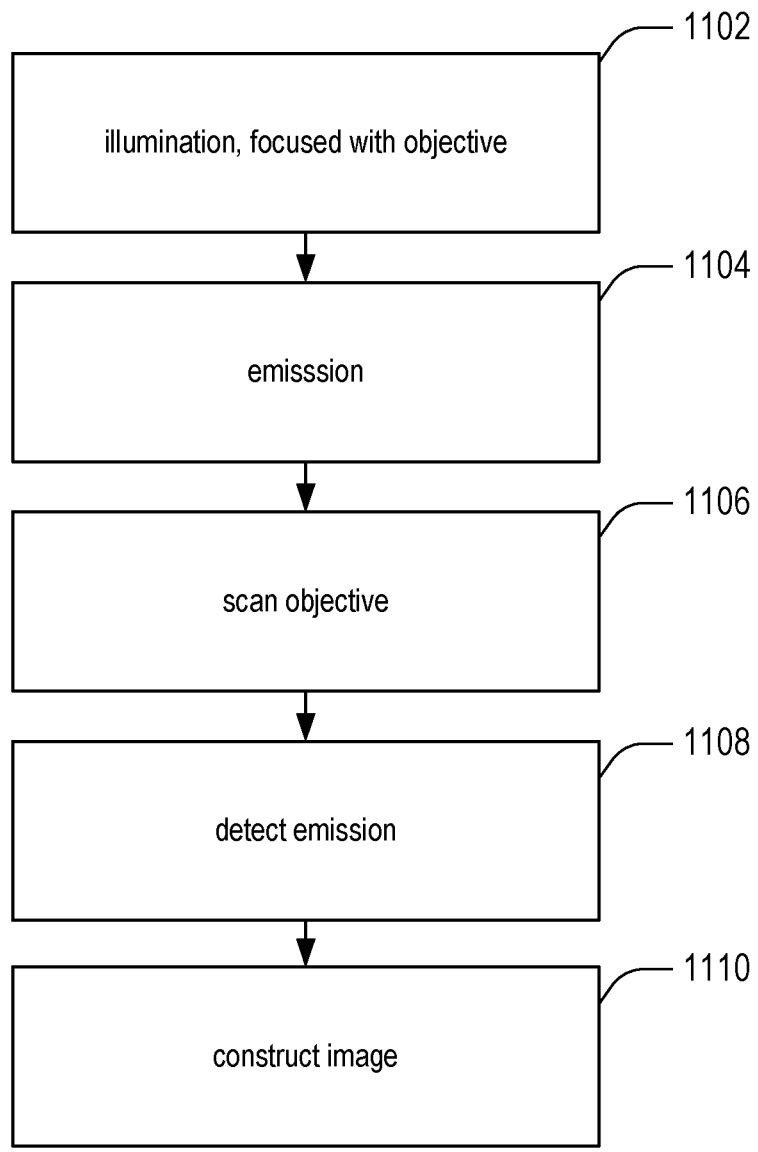
FIG. 11 is a flow chart illustrating a method of inducing and detecting non-linear optical emission in a sample, according to an embodiment of the present invention.

FIG. 11 is a flow chart illustrating a method of inducing and detecting optical emission in a sample, according to an embodiment of the present invention.

The method has the following steps, which may be implemented using the embodiments of microscopes described herein:

1102: Providing excitation radiation and focussing the excitation radiation using an objective to provide the excitation radiation in a focal volume. The radiation may be at sufficient intensity to cause 1104 non-linear emission of emission radiation from the sample in the focal volume. The emission may comprise non-linear emission, such as multiphoton fluorescence emission, second or third harmonic generation emission and/or coherent anti-Stokes Raman emission. The excitation radiation is provided on-axis to the objective and may overfill the objective's aperture with excitation radiation. Focussing the excitation radiation comprises focusing the excitation radiation to a point without spherical aberration. This is done using one or more aspheric lens or mirror as the objective. Alternatively, or additionally, one or more axicon may be used as the objective to focus the excitation radiation to a line.

1106: Scanning the objective in at least two dimensions so as to scan the emitting focal volume in corresponding dimensions. This may involve scanning the objective in two dimensions transverse with respect to the objective's optical axis so as to scan the emitting focal volume in corresponding dimensions. This may involve scanning the objective in a plane perpendicular to the objective lens' optical axis so as to scan the emitting focal volume in a corresponding sample plane. The objective may be scanned in a Lissajous pattern. It may be scanned using a kinematic flexure mechanism as described herein.

1108: Detecting the emission radiation from the scanned focal volume. This can involve collecting the emission radiation (i) emitted along the optical axis of the objective, (ii) via the objective (in a descanned mode) and/or (iii) emitted off the optical axis of the objective and away from excitation radiation exiting the focal volume.

1110: Constructing an image corresponding to the scan by the focal volume, based on the detected emission radiation.

The steps of the method can be performed in various orders or concurrently.

The invention claimed is:

1. A non-linear optical scanning microscope for inducing non-linear optical emission in a sample using a pulsed laser illumination system operable to provide excitation radiation, the microscope comprising:
   an aspheric objective configured to focus the excitation radiation, such that the illumination system and the objective are operable together to provide the excitation radiation in a focal volume at sufficient intensity to cause non-linear emission of emission radiation from the sample in the focal volume; and
   an objective scanner operable to scan the objective linearly in each of two dimensions transverse to the objective's optical axis corresponding to x and y directions, so as to scan the objective in a plane perpendicular to the objective's optical axis and to scan the emitting focal volume in corresponding dimensions in a sample plane,
   wherein the objective scanner comprises a kinematic flexure mechanism and an x-y transducer connected to the kinematic flexure mechanism which acts as a scanning lens mount.

2. The non-linear optical scanning microscope of claim 1, wherein the objective is configured to focus the excitation radiation without, or with minimal, spherical aberration.

3. The non-linear optical scanning microscope of claim 1, wherein the objective comprises one or more optical elements selected from the group of optical elements consisting of: aspheric lens, axicon and aspheric mirror.

4. The non-linear optical scanning microscope of claim 1, wherein the objective scanner is operable to scan the objective from a scan range of 10 microns to a scan range of more than 1 mm.

5. The optical scanning microscope of claim 1, wherein the objective comprises a single optical element.

6. The non-linear optical scanning microscope of claim 1, wherein the objective comprises a plurality of optical elements distributed perpendicular to the objective's optical axis.

7. The non-linear optical scanning microscope of claim 1, wherein the illumination system is arranged with the objective to provide diverging excitation radiation to the objective.

8. The non-linear optical scanning microscope of claim 1, wherein the objective scanner is operable to scan the objective in a Lissajous pattern.

9. The non-linear optical scanning microscope of claim 1, comprising collection optics arranged to collect the emission radiation emitted along the optical axis of the objective.

10. The non-linear optical scanning microscope of claim 1, comprising collection optics arranged to collect the emission radiation via the objective.

11. The non-linear optical scanning microscope of claim 1, comprising collection optics arranged to collect the emission radiation emitted off the optical axis of the objective and away from excitation radiation exiting the focal volume.

12. The non-linear optical scanning microscope of claim 1, wherein the kinematic flexure mechanism is configured to kinematically decouple actuators respectively corresponding to the at least two dimensions.

13. The non-linear optical scanning microscope of claim 1, wherein the kinematic flexure mechanism is a unitary 3D-printed member.

14. The non-linear optical scanning microscope of claim 1, wherein the illumination system is arranged with the objective to provide excitation radiation on-axis to the objective.

15. The non-linear optical scanning microscope of claim 14, wherein the illumination system is configured to overfill the objective's aperture with excitation radiation.

16. The non-linear optical scanning microscope of claim 1, wherein the kinematic flexure mechanism comprises a rigid exterior frame surrounding, in a plane of two of the dimensions, interior beam flexures that support the objective.

17. The non-linear optical scanning microscope of claim 16, wherein the interior beam flexures are actuated through holes in the rigid exterior frame.

18. A method of inducing and detecting non-linear optical emission in a sample, the method comprising:
   providing excitation radiation;
   focussing the excitation radiation using an aspheric objective, to provide the excitation radiation in a focal volume at sufficient intensity to cause non-linear emission of emission radiation from the sample in the focal volume;
   scanning the objective linearly in each of two dimensions transverse to the objective's optical axis corresponding to x and y directions, so as to scan the objective in a plane perpendicular to the objective's optical axis and to scan the emitting focal volume in corresponding dimensions in a sample plane; and
   detecting the emission radiation from the scanned focal volume,
   wherein scanning the objective uses a kinematic flexure mechanism and an x-y transducer connected to the kinematic flexure mechanism which acts as a scanning lens mount.

* * * * *